United States Patent [19]
Tozu et al.

[11] Patent Number: 5,470,136
[45] Date of Patent: Nov. 28, 1995

[54] ANTI-SKID CONTROL SYSTEM

[75] Inventors: Kenji Tozu; Kenji Asano; Hiroaki Kawai, all of Aichi Pref., Japan

[73] Assignee: Aisin Seiki Kabushiki Kaisha, Kariya, Japan

[21] Appl. No.: 358,605

[22] Filed: Dec. 14, 1994

Related U.S. Application Data

[63] Continuation of Ser. No. 950,998, Sep. 25, 1992, abandoned.

[30] Foreign Application Priority Data

Nov. 9, 1992 [JP] Japan ..................... 3-246154

[51] Int. Cl.$^6$ .................................................. B60T 8/24
[52] U.S. Cl. ..................... 303/147; 303/113.4; 303/163; 364/426.02
[58] Field of Search .................. 180/197; 303/9.67, 303/9.68, 22.1, 22.2, 24.1, 97, 99, 103, 105, 108, 111, 113.4, 91, 95, 100, 106; 364/426.01–426.03

[56] References Cited

U.S. PATENT DOCUMENTS

| | | | |
|---|---|---|---|
| 3,917,353 | 11/1975 | Swiden et al. | 303/106 |
| 3,967,862 | 7/1976 | Hunter et al. | 180/197 X |
| 4,347,569 | 8/1982 | Allen, Jr. et al. | 180/197 X |
| 4,489,382 | 12/1984 | Jonner et al. | 303/110 X |
| 4,653,816 | 3/1987 | Lin | 303/97 X |
| 4,712,839 | 12/1987 | Brearley et al. | 303/22.1 X |
| 4,758,053 | 7/1988 | Yasuno | 303/111 X |
| 4,763,912 | 8/1988 | Matsuda | 180/197 |
| 4,795,219 | 1/1989 | Brearley et al. | 303/22.1 X |
| 5,051,908 | 9/1991 | Shiraishi | 180/197 X |
| 5,210,690 | 5/1993 | Kageyama et al. | 303/95 X |
| 5,211,453 | 5/1993 | Van Zanten et al. | 303/24.1 X |

FOREIGN PATENT DOCUMENTS 5653945  10/1979  Japan.

Primary Examiner—Robert J. Oberleitner
Assistant Examiner—Alfred Muratori
Attorney, Agent, or Firm—Sughrue, Mion, Zinn, Macpeak & Seas

[57] ABSTRACT

An anti-skid control system for use in an automotive vehicle comprises a brake detecting device for detecting a braking operation of the vehicle, a deceleration detecting device for detecting a deceleration of a road-wheel during the braking operation, and a control device for controlling the braking operation in order to establish the maximum value of the deceleration. Independent of a surface of a road, the minimum braking distance is obtained.

6 Claims, 10 Drawing Sheets

5,470,136

ANTI-SKID CONTROL SYSTEM

This is a Continuation of patent application Ser. No. 07/950,998 filed Sep. 25, 1992 now abandoned.

BACKGROUND OF THE INVENTION

The present invention relates to an anti-skid control system for use in an automotive vehicle, and in particular to an anti-skid control system for controlling braking force applied to road-wheels in braking operation to prevent the road-wheels from being locked.

In general, in an anti-skid control system, braking force is set to be adjusted for setting an adequate slip rate on the basis of a speed of each road-wheel, an acceleration, and an estimated speed of a vehicle body. One example of such anti-skid control system is disclosed in Japanese Patent Laid-open Print No. Sho 56-53945 published in 1981. In this anti-skid control system, in order to establish a slip rate of about 15%, the braking pressure is controlled for the adjustment of each road-wheel.

Normally, a deceleration of the road-wheel is increased as the slip rate becomes higher, and is tuned to be decreased after passing its maximum value, as indicated by a graph "A" in FIG. 10. However, if the road is a snow-covered one or a gravel covered one which establishes a shorter braking distance in spite of a slip rate, the slip rate is subject to increase to 100% as shown in a graph "B" in FIG. 10. Thus, when the slip rate is set to be about 15%, sometimes the braking distance may become longer than that when the road-wheel is in the locked condition.

SUMMARY OF THE INVENTION

It is, therefore, a primary object of the present invention to provide an anti-skid system for an automotive vehicle which establishes a shorter braking distance independent of a road condition.

It is another object of the present invention to provide an anti-skid system for an automotive vehicle in which a braking pressure to each road-wheel is adjusted on the basis of a slip rate that is set to be varied on the basis of the maximum deceleration.

In order to attain the foregoing objects, an anti-skid control system for use in an automotive vehicle is comprised of brake detecting means for detecting a braking operation of the vehicle, deceleration detecting means for detecting a deceleration of a road-wheel during the braking operation, and control means for controlling the braking operation in order to establish the maximum value of the deceleration.

BRIEF DESCRIPTION OF THE DRAWINGS

The above and other objects, features and advantages of the present invention will be more apparent and more readily appreciated from the following detailed description of preferred exemplarily embodiment of the present invention, taken in connection with the accompanying drawings, in which.

DESCRIPTION OF THE PREFERRED EMBODIMENTS

Embodiments of the present invention will be described hereinunder in detail with reference to the accompanying drawings.

Figure 2:
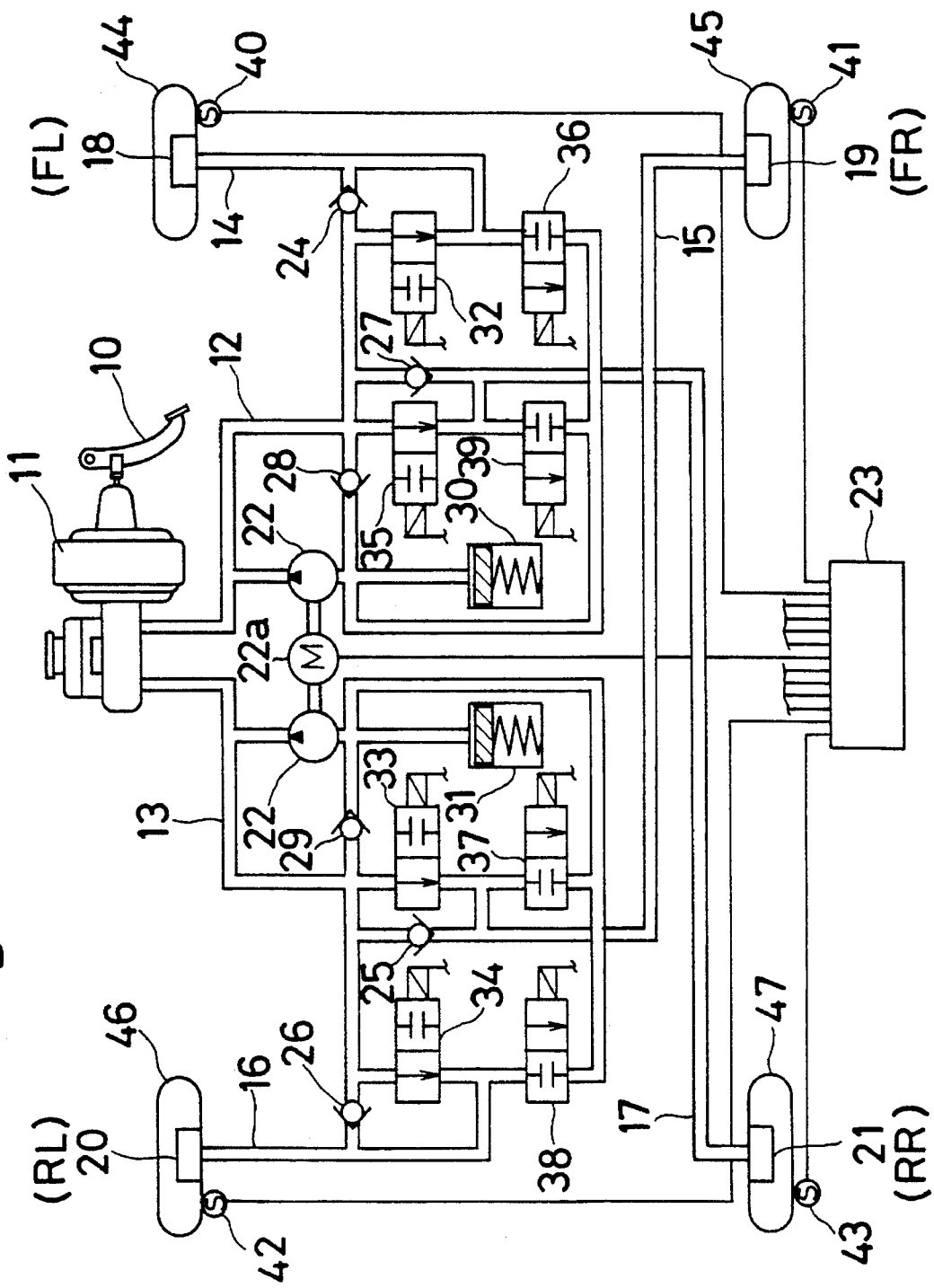
FIG. 2 shows an overall structure of an anti-skid system according to the present invention.

Referring first to FIG. 2, an overall structure of a pressure circuit of an anti-skid control system is shown. Conduits 12 and 13 are connected to a master cylinder 11. The conduit 12 is connected, via an electromagnetic valve 32 and a one-way valve 24, to a conduit 14 which is in fluid communication with a wheel cylinder 18 of a front-left road-wheel 44. The conduit 14 is also connected via an electromagnetic valve 36 to a drain 30. The conduit 12 is connected via an electromagnetic valve 35 and a one-way valve 27 to a conduit 17 which is in fluid communication with a wheel cylinder 21 of a rear-right road-wheel 47. The conduit 17 is connected to the drain 30 via an electromagnetic valve 39.

The conduit 13 is connected, via an electromagnetic 33 and a one-way valve 25, to a conduit 15 which is in fluid communication with a wheel cylinder 19 of a front-right road-wheel 45. The conduit 15 is also connected via an electromagnetic valve 37 to a drain 31. The conduit 13 is connected via an electromagnetic valve 34 and a one-way valve 26 to a conduit 16 which is in fluid communication with a wheel cylinder 20 of a rear-left road-wheel 46. The conduit 16 is connected to the drain 31 via an electromagnetic valve 38.

Each of the one-way valves is set to be opened, when an inner pressure of the corresponding wheel cylinder is above the pressure in the conduit 12 (13), for returning the braking pressure thereto, which leads to a prevention of an excessive supply of the braking pressure to each road-wheel. Each of the electromagnetic valves 32, 33, 34 and 35 is in a normally opened type valve, and is set to be closed when energized or actuated. Each of the electromagnetic valves 36, 37, 38, and 39 is a normally closed type valve, and is set to be opened when energized or actuated. Thus, so long as no electromagnetic valves are being energized or actuated, the fluid communication of the conduit 12 with the conduits 14 and 17 is established as well as the fluid communication of the conduit 13 with the conduits 15 and 16. Upon depression of a brake pedal 10, the master cylinder 11 increases the fluid pressure in each of the conduits 12 and 13. The resultant pressure increase is transmitted to the wheel cylinders 18, 19, 20 and 21 for regulating the rotation of the road-wheels 44, 45, 46 and 47. This means that the braking force depends on the degree of the depression of the brake pedal 10.

A pair of pumps 22 and 22a are set to be driven by a motor 22a. Outlet ports of the pumps 22 and 22a are connected to the conduits 12 and 13, respectively. As previously described, during the deenergized condition of each of the electromagnetic valves, the conduit 12 (13) is in fluid communication with the wheel cylinders 18 and 21 (19 and 20). Under such condition, if the motor 22a is driven or turned on, the inner pressure of each of the wheel cylinders 18, 19, 20 and 21 can be increased. Then, both of the electromagnetic valves 32 and 36 are energized, the electromagnetic valves 32 and 36 are closed and opened, respectively, and the fluid in the wheel cylinder 18 is drained into the drain 30. Thus, activation of the electromagnetic valves 32 and 36 will decrease the inner pressure of the wheel cylinder 18 of front-left road-wheel. Similarly, the inner pressures of the wheel cylinder 21 of the rear-right road-wheel 47, the wheel cylinder 21 of the front-right road-wheel 45, and the wheel cylinder 20 of the rear-left road-wheel 46 can be decreased by the actuations of the electromagnetic valves 35 and 39, the electromagnetic valves 33 and 37, and the actuations of the electromagnetic valves 34 and 38, respectively. The foregoing operation of each the combination of two electromagnetic valves enables the adjustment of the inner pressure of the wheel cylinder, which results in the adjustment of the control of the respective road-wheel. The motor 22a and the electromagnetic valves are under the control of an electric control unit 23 which in the form of a microprocessor or CPU. It is to be noted that a one-way valve 28 (29) is disposed between the conduit 12 (13) and the drain 30 (31) in order that when the pressure in the drain 30 (31) exceeds a set value the pressure is returned to the conduit 12 (13).

Figure 3:
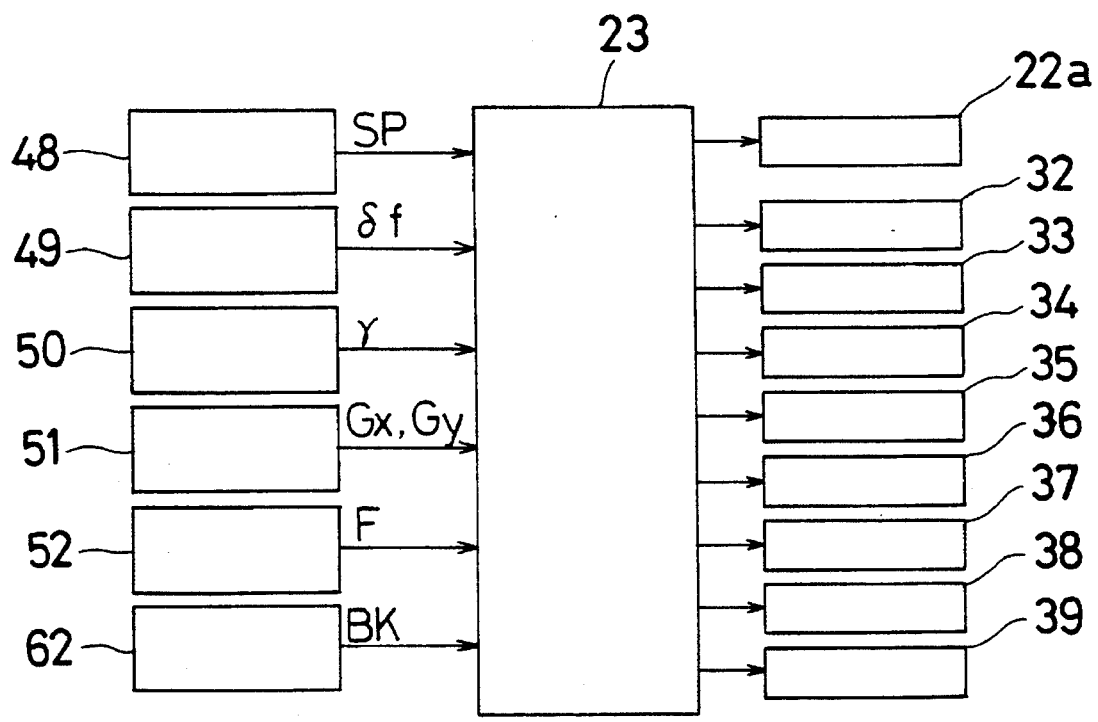
FIG. 3 is a block diagram showing the relationship between an electric control unit and each of sensors.

Sensor means 40, 41, 42 and 43 are provided to the front-left road wheel 44, the front-right road wheel 41, the rear-left road-wheel 46, and the rear-right road-wheel 47, respectively, in order to feed signals relating to the conditions thereof to the electric control unit 23. Each sensor means 40/41/42/43 includes a vehicle speed sensor 48 and a load sensor 52 (FIG. 3). As shown in FIG. 3, the vehicle speed sensor 48 is set to detect the rotational speed of each road wheel and the resulting speed is fed as pulse signals SP to the control unit 23. The load sensor 52 is set to detect a load F applied to each road-wheel. This load sensor 52 can be used as an estimated load sensor which estimates the load on the basis of a sprung acceleration, an upsprung acceleration, a vehicle-height and a pressure from the suspension. In addition to the forgoing sensors, the control unit 23 is connected with a steering angle sensor 49 detecting a steering angle δf, a yaw rate sensor 50 detecting a yaw rate γ, and an acceleration sensor 51 detecting accelerations GX and GY in the longitudinal and lateral directions, respectively, of the vehicle-body. The control unit 23 is also connected with a brake switch 62 which detects the depression of the brake pedal 10. On the basis of signals from the sensors 48 through 52, the control unit 23 is set to operate the motor 22a, and the electromagnetic valves 32 through 39.

Figure 4:
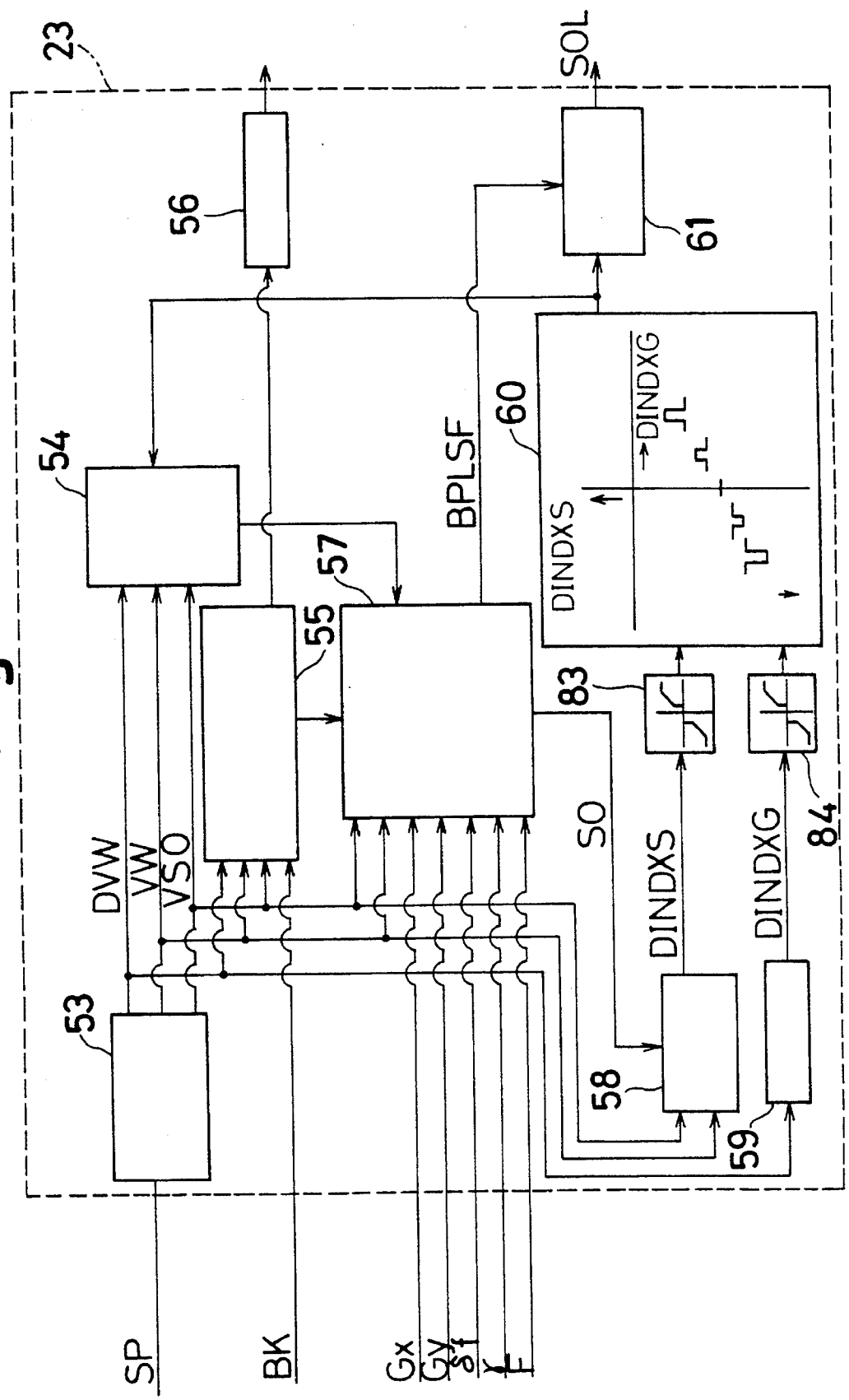
FIG. 4 is a block diagram showing a detailed structure of an electric control unit.

The control unit 23, as shown in FIG. 4, includes a calculating division 53 for calculating the vehicle speed, the acceleration, and the estimated speed, a road-surface condition recognition division 54, an initiation/termination of the control recognition division 55, a motor control division 56, a target slip rate calculating division 57, a slip rate component calculating division 58, a G-component calculating division 59, a control mode setting division 60, and a solenoid control division 61. In the road-surface condition recognition division 54, the condition of a road surface is recognized on the basis of the wheel speed and other factors. The initiation/termination of the control recognition division 55 is set to make a decision whether an ABS control should be establish or not. The motor control division 56 drives the motor 22a for generating the fluid pressure depending on the ABS control condition. In the target slip rate calculating division 57, a target slip rate of each road-wheel is set to be calculated. In the slip rate component calculating division 58, and the G-component calculating division 59, a slip rate and an acceleration component for setting the control mode are calculated, respectively. In the control mode setting division 60, on the basis of the slip rate and the acceleration component, the control mode for each road-wheel is obtained. In the solenoid control division 61, on the basis of the resultant control mode in the control mode setting division 60, the electromagnetic valves are controlled corresponding to each road-wheel in order to adjust the fluid pressure of the wheel cylinder, thereby adjusting the slip condition of each road-wheel. It is to be noted that the road-wheels 44, 45, 46, and 47 are set to be controlled independently by the foregoing divisions other than the initiation/termination of the control recognition division 55 and the motor control division 56.

Hereinafter each division of the control unit will be detailed. In the calculating division 53, a rotational acceleration DVW, a rotational speed VW, and an estimated vehicle speed VS0 of each road-wheel are calculated on the basis of the signal SP from the respective wheel speed sensor 48. The estimated speed is defined as the vehicle speed at a portion thereof at which each road-wheel is provided. The rotational speed of VW is set to be calculated based on the radius of each road-wheel and the width of pulse (or a periodic time) of the signal SP. The rotational acceleration DVW is obtained by differentiating the rotational speed of VW with respect to time t. The estimated vehicle speed VS0 of each road-wheel is obtained from the respective rotational speed of VW in light of the turning motion of the vehicle and other factors.

In the road-surface condition recognition division 54, taking into consideration of the rotational acceleration DVW, the rotational speed VW, and the estimated vehicle speed VS0, the road surface is deemed to be of a high friction coefficient μ, of a low friction coefficient μ, a bad, and other situation. As will be detailed, in the anti-skid control, before an order is issued to the electromagnetic valves in order to increase, decrease, or hold the fluid pressure each wheel cylinder, a rapid-decrease mode, a pulse-decrease mode, or a pulse-increase mode is established or set. If the frequent occurrence of the pulse-increase mode is found, the road-surface is deemed to be of the high friction coefficient μ. If the pulse-decrease mode or the rapid-decrease mode is continued for a long time as well as the estimated vehicle speed excesses a set value, the road-surface is deemed to be of the low friction coefficient μ. If a deviation between the rotational acceleration DVW and an estimated vehicle acceleration DVS0 as a result of the differential value of the estimated vehicle speed VS0 is in excess of a set value, the road is regarded as the bad surface road.

The initiation/termination of the control recognition division 55 establishes an initiation and a termination of the anti-skid control based on a brake output BK of the brake switch 62, the estimated vehicle speed VS0, the rotational acceleration DVW, the rotational speed VW. If the brake switch 62 is in on-condition and the estimated vehicle speed VS0 is within a range, the anti-skid control is deemed to be initiated. If the termination of the pulse-increase mode is found in each road-wheel, the the anti-skid control is deemed to be terminated.

In the motor control division 56, upon receipt of signals for the initiation and termination from the initiation/termination of the control recognition division 55, the motor 22a is turned on and turned off, respectively.

Figure 5:
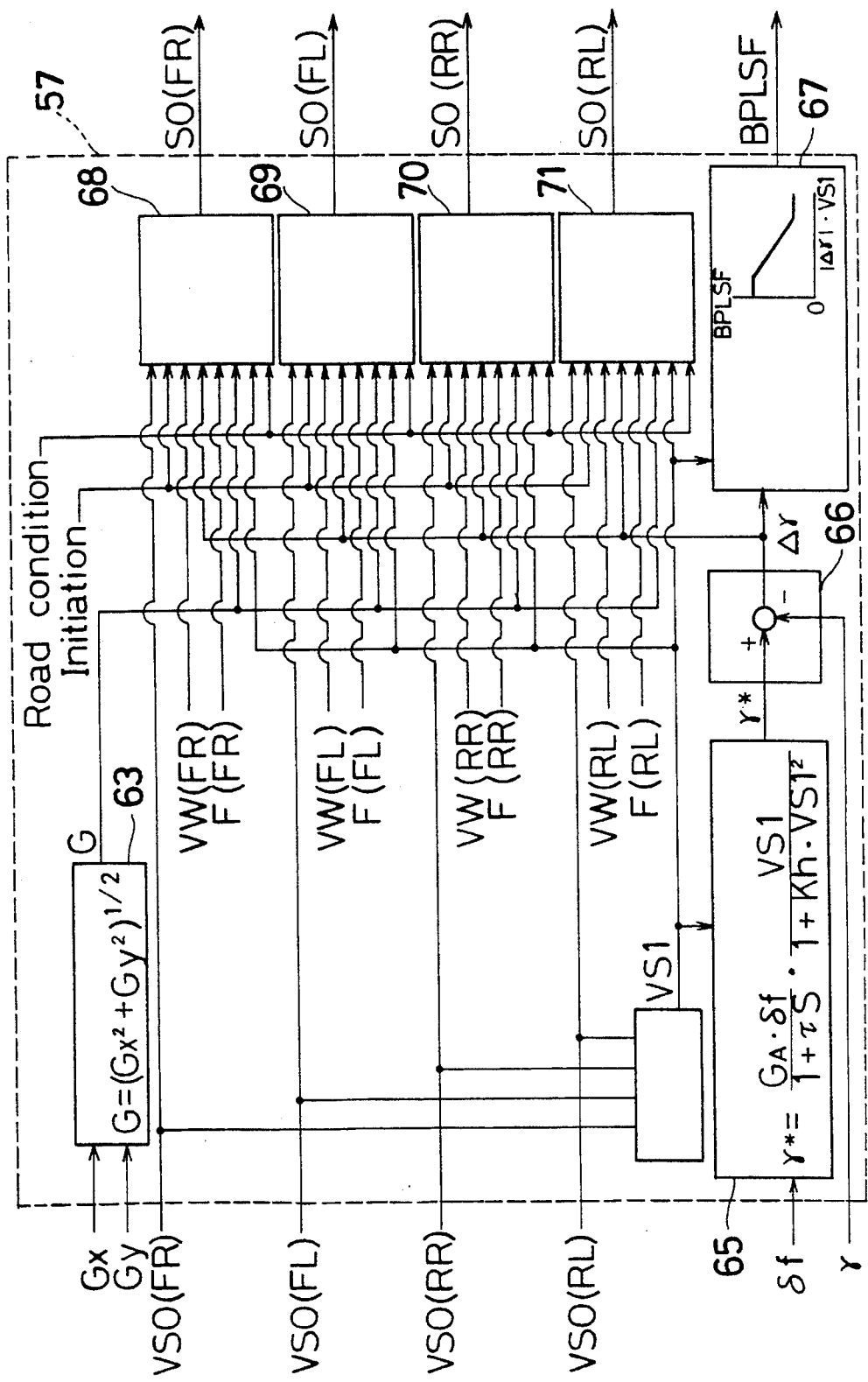
FIG. 5 is a block diagram showing a detailed structure of a target slip rate calculating division of an electric control unit.

The target slip rate calculating division 57 is set to calculate the target slip rate on the basis of the longitudinal acceleration GX, the lateral acceleration GY, the steering angle δf, the real yaw rate γ, the load F, the estimated vehicle speed VS0, and the road surface condition. The detailed structure of the calculating division 57 is illustrated in FIG. 5. The target slip rate SO is calculated at each of calculating units 68, 69, 70, and 71 which corresponds to the road-wheels, on the basis of the maximum deceleration G, the maximum vehicle speed VS1, the yaw rate deviation Δγ, the road surface, the condition upon initiation of the ABS control, such estimated vehicle speed VS0, each rotational speed VW, and the load F.

The maximum deceleration G is obtained at a maximum deceleration calculating unit 63 by using the following formula (1).

$$G=(GX^2+GY^2)^{1/2} \qquad (1)$$

The maximum vehicle speed V1 is obtained, at a maximum vehicle speed calculating unit 64, as the maximum value of the estimated vehicle speed VS0 of each road-wheel. As for the yaw rate deviation Δγ, first of all, a target yaw rate γ* is obtained at a target yaw rate calculating unit 65 by using the following formula (2).

$$\gamma^*=(G_B \times \delta f)/(1+\tau S) \times VS1/(1+Kh \times VS1^2) \qquad (2)$$

The yaw rate deviation Δγ is calculated at a Δγ-calculating unit 66 by using the following formula (3).

$$\Delta\gamma=\gamma^*-\gamma \qquad (3)$$

Figure 1:
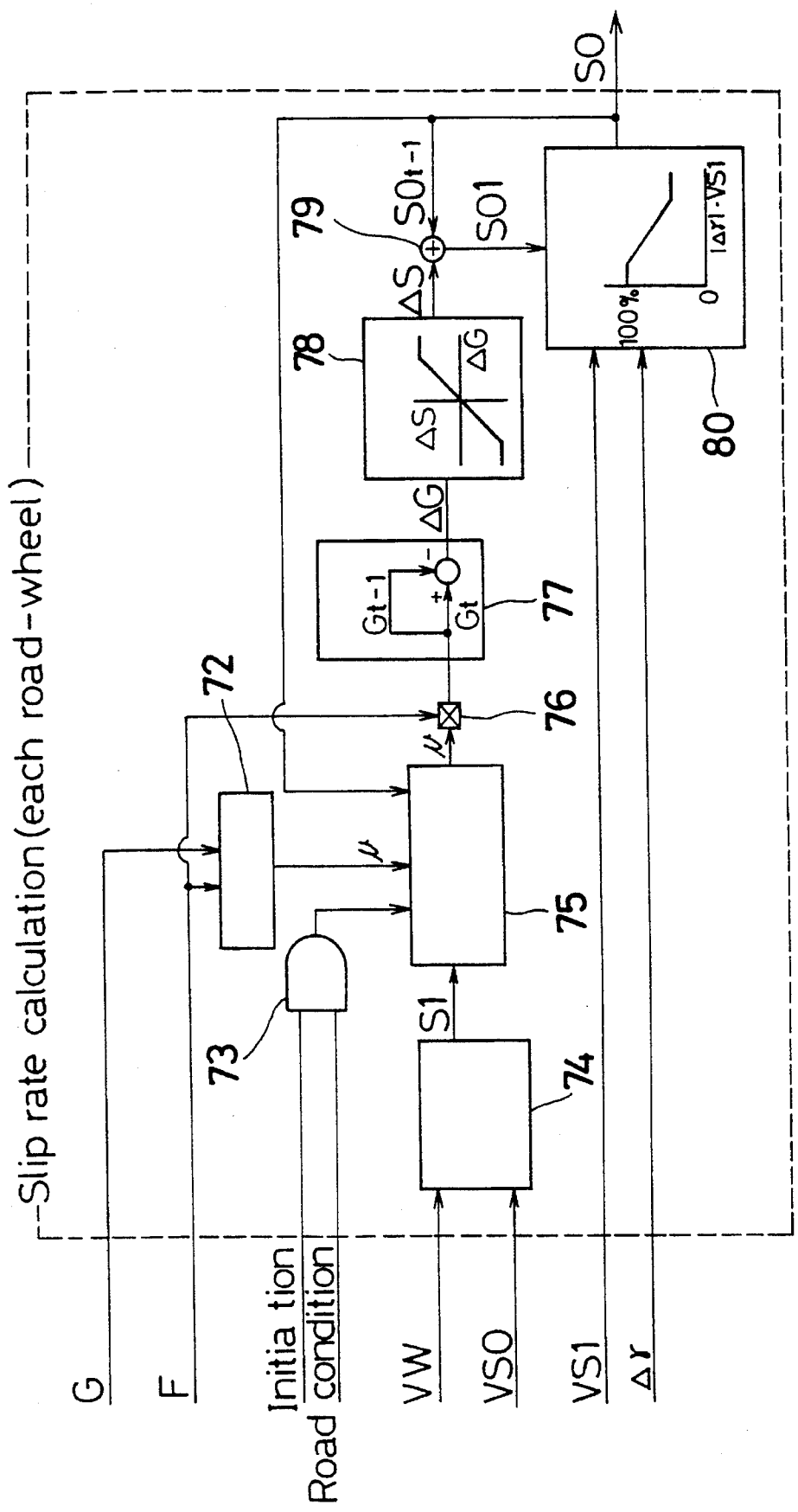
FIG. 1 is a block diagram showing a slip rate calculating division of an anti-skid system according to the present invention.

A detailed structure of each of the slip rate calculating units 68, 69, 70, and 71 is shown in FIG. 1. Each unit is set to output the target yaw rate S0 by being inputted with the maximum deceleration G, the load F, initiation of the ABS-control, the maximum vehicle speed VS1, and the yaw rate deviation Δγ. Each unit includes a real slip rate calculating portion 74, a μ-allocating portion 72, an AND-circuit 73, a μ-S table portion 75, a multiplying portion 76, a ΔS-calculating portion 78, an adding portion 78, and a slip rate regulating portion 80.

In this unit 68/69/70/71, first of all, at the real slip rate calculating portion 74, from the formula (4), the real slip rate S1 is obtained.

$$S1=(VS0-VW)/VS0 \qquad (4)$$

Figure 6:
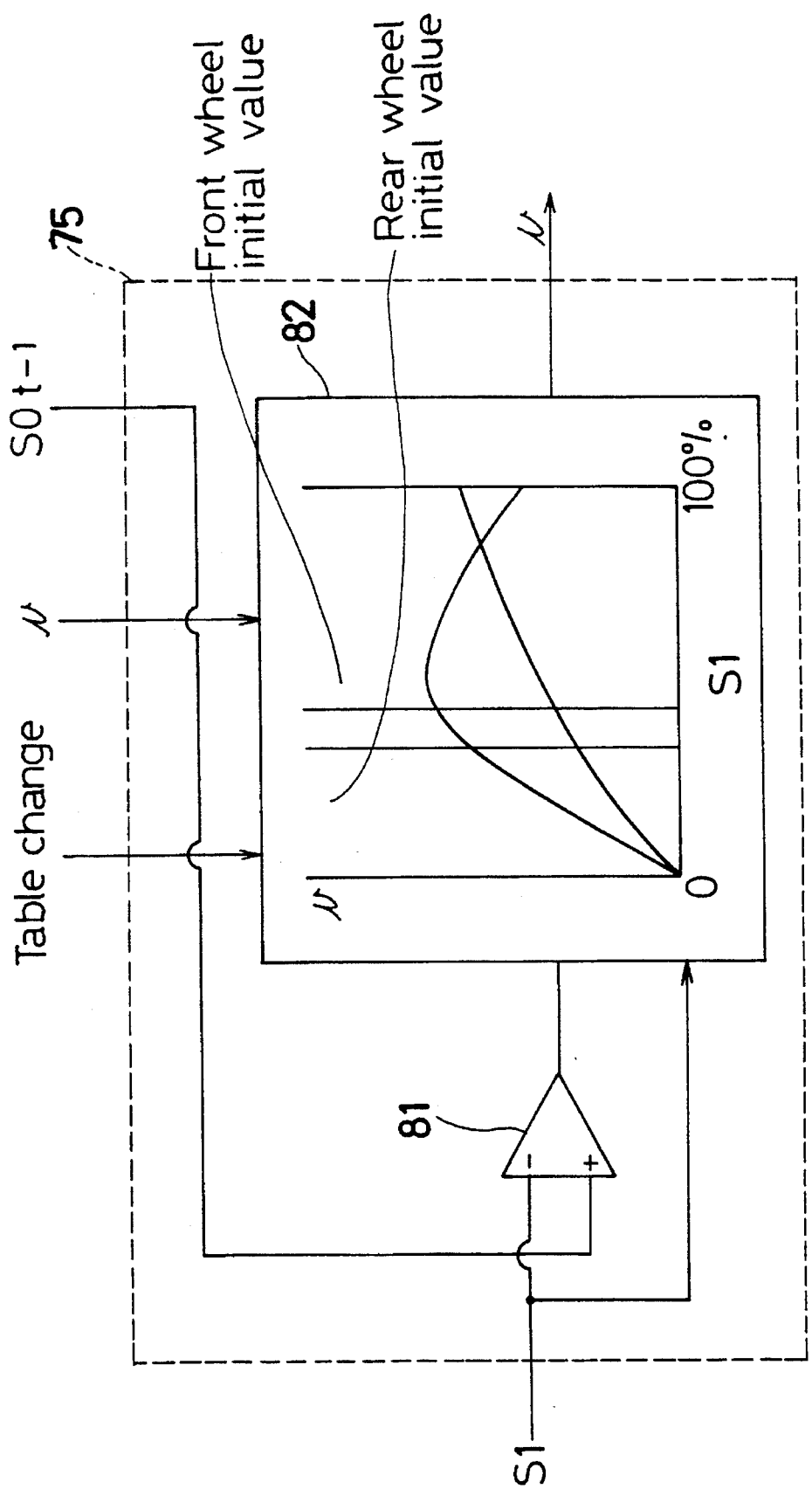
FIG. 6 is a block diagram showing a μ-S table of an electric control unit.
Figure 7:
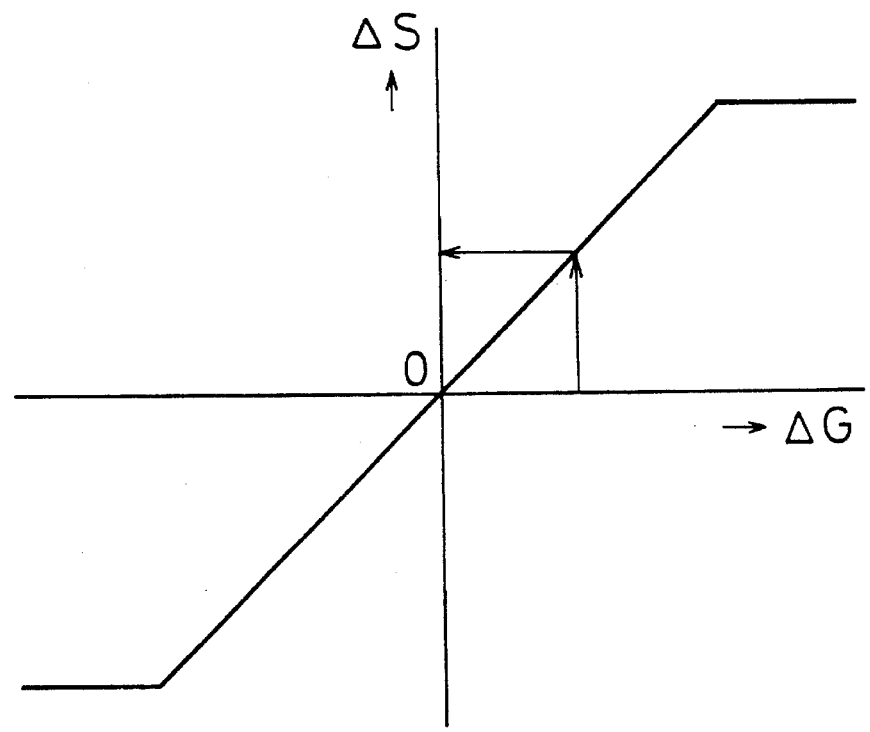
FIG. 7 is a graph showing an operation of a ΔS calculating portion of an electric control unit.

In addition, at the μ-allocating portion 72, the μ is obtained on the basis of the deceleration G and the load F. In principle, the μ is obtained by the formula of μ=G/F. This μ is allocated in accordance with the condition of each road-wheel. The μ in each road-wheel is given to the μ-S table portion 75. The AND-circuit 73 is set to receive the anti-skid control initiation signal and the road condition signal. If one of the signals is changed, a μ-S table 82 (FIG. 6) in the μ-S table portion 75 is set to be initialized. This is intended to establish an optimal anti-skid control depending on the road condition. Upon completion of the initialization, initial values of the front road-wheel and the rear road-wheel are set to be Sf and Sr, respectively, and the relationship between the μ and the target slip rate is plotted on the μ-S table 82 (FIG. 6). The resulting μ is fed to the multiplying portion 76 to be multiplied with the load F, resulting in that the acceleration Gt is obtained. This acceleration Gt is fed to the ΔS-calculating portion 78 and is subtracted with the latest acceleration Gt-1 for obtaining an acceleration increment ΔG. At the ΔS-calculating portion 78, the acceleration increment ΔG is corresponded to a graph shown in FIG. 7, and a slip ratio increment ΔS is obtained. The present target slip ratio S01 is calculated by addition of the resultant slip rate increment ΔS and the latest slip rate S01t-1.

Figure 8:
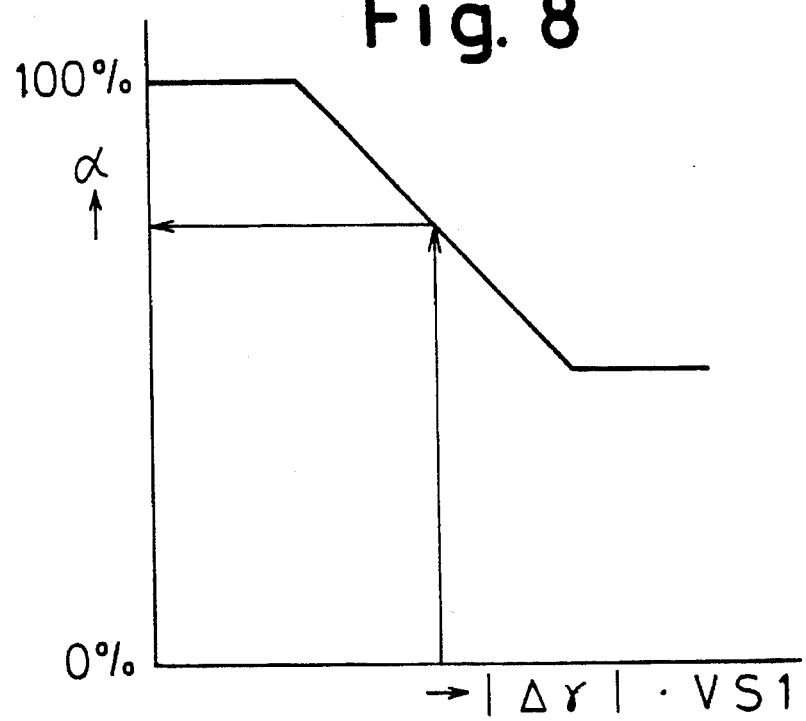
FIG. 8 is a graph showing an operation of a slip rate regulating portion portion of an electric control unit.

Thus obtained present target slip rate S01 is so fed to the slip rate regulating portion 80 as to be regulated. That is to say, a rate α is obtained by using a graph shown in FIG. 8 and the addition of the maximum vehicle speed VS1 and the absolute value of the yaw rate deviation Δγ. Then, the present target slip rate SO1 is multiplied with the rate α for obtaining the target slip rate SO. As the maximum vehicle speed VS1 increases, or the absolute value of the yaw rate deviation Δγ increases, the target slip rate SO is decreased. Thus, when the steering operation of the driver and the actual vehicle's motion is in coincidence, the control should be established in such a manner that as will be detailed later the slip rate becomes its maximum value. If not, the target slip rate is decreased in order to effect the cornering force.

The target slip rate SO is fed outside the unit and is returned to the μ-S table portion 75. The μ-S table portion 75, as shown in FIG. 6, has a comparator 81 for comparing the target slip rate SO with the detected slip rate S1, and upon coincidence of both values the relationship between the μ and the target slip rate SO is plotted on the μ-S table 82. The μ is fed to the multiplying portion 76. In the foregoing processing, if the deceleration increases with the passing of time, ΔG and ΔS become positive, resulting in the increase of the target slip rate. Thus, the slip quantity of each road-wheel is increased, which results in that the increase of the vehicle's deceleration is restricted. On the other hand, if the deceleration decreases with the passing of time, ΔG and ΔS become negative, resulting in the decrease of the target slip rate. Thus, the slip quantity of each road-wheel is decreased, which results in that the vehicle's deceleration is increased. Thus, the continuation of the foregoing processing will bring the maximum value of deceleration. In relation to the slip rate, the deceleration is proved to be of only one maximum value, which results in that this maximum value is the greatest value of the deceleration. That is to say, in the foregoing processing, except for the the slip rate regulating portion 80, remaining elements serve for obtaining the target slip rate which brings the greatest deceleration. Such control brings the greatest deceleration independent of the μ of the road surface condition and therefore the minimum braking distance can be obtained.

In the foregoing processing, the μ is calculated by the acceleration detected and the load by the sensors. Instead of the detected acceleration, a differential value of each rotational speed VS0 is available. In addition, the load can be obtained from each of outputs of the height sensor, the sprung acceleration sensor and the suspension pressure sensor.

Referring back to FIG. 4, the obtained target slip rate is set to be fed to the component calculating division 58 and on the basis of the following formula (5) the slip rate component DINDXS is calculated.

$$DINDXS=SO-(VS0-VW-IVW-BVW)/VS0 \qquad (5)$$

where IVW is an integrated value of the rotational speed of the wheel VW, and BVW is a constant.

Figure 12:
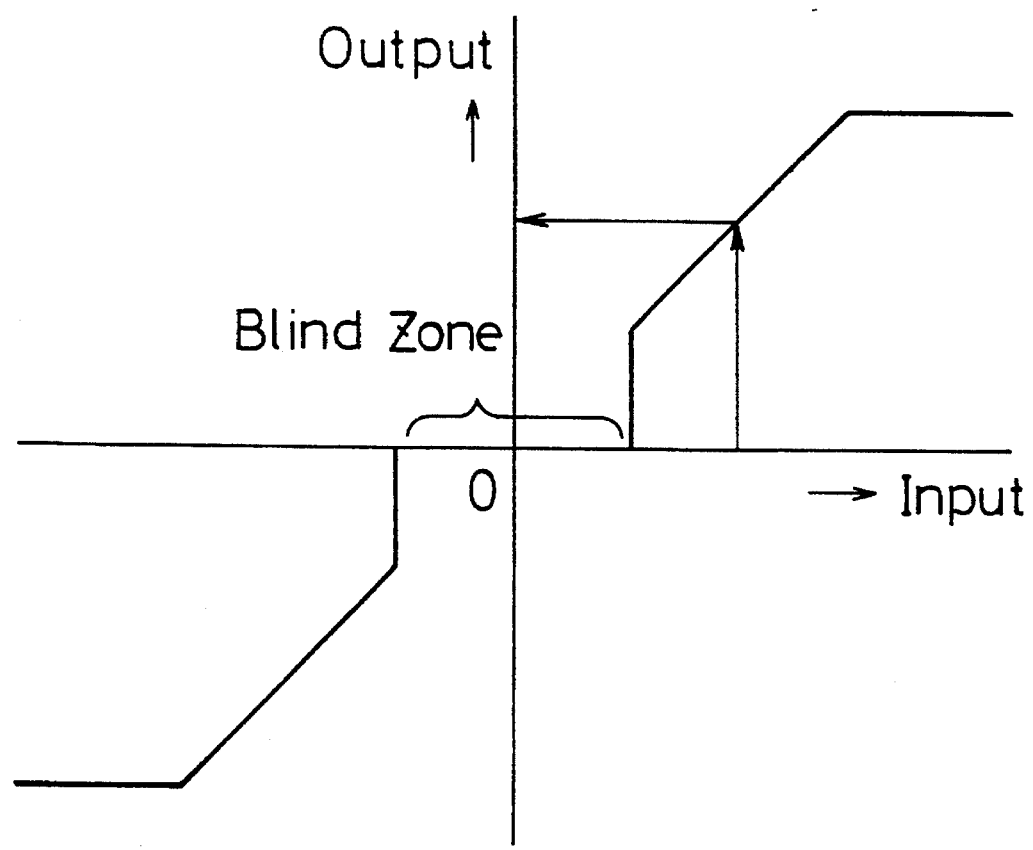
FIG. 12 is a graph showing an operation of a limiter of an electric control unit.

In this formula, (VS0–VW)/VS0 corresponds to the real slip rate S1 as apparent from the formula (4). The slip rate component DINDXS is fed via a limiter 83 to the control mode setting division 60. As shown in FIG. 12, if the slip rate component DINDXS is less than a value the limiter 83 establishes a blind zone wherein the output is set to be zero. The reason is to prevent the control in response to a noise included in the slip rate component DINDXS. As a result of the blind zone, the foregoing integrated value IVW serves for the correction of the slip rate when the slip rate component DINDXS is generated within a minute range for a long time. The constant BVW serves for increasing a deviation between the target slip rate and the real slip rate when the rotational speed VW is low. As the vehicle speed becomes higher, VS0 becomes extremely large relative to BVW, BVW becomes neglectable small. Thus, the slip rate component DINDXS is a substantially modification of a value which is obtained by subtracting the real slip rate from the target slip rate S0 and shows a slip rate deviation.

In the G-component calculating division 59, a G-component is obtained by subtracting a set value G0 from the rotational acceleration DVW. Like the slip rate component DINDXS, the G-component is fed via a limiter 84 to the control mode setting division 60.

Figure 9:
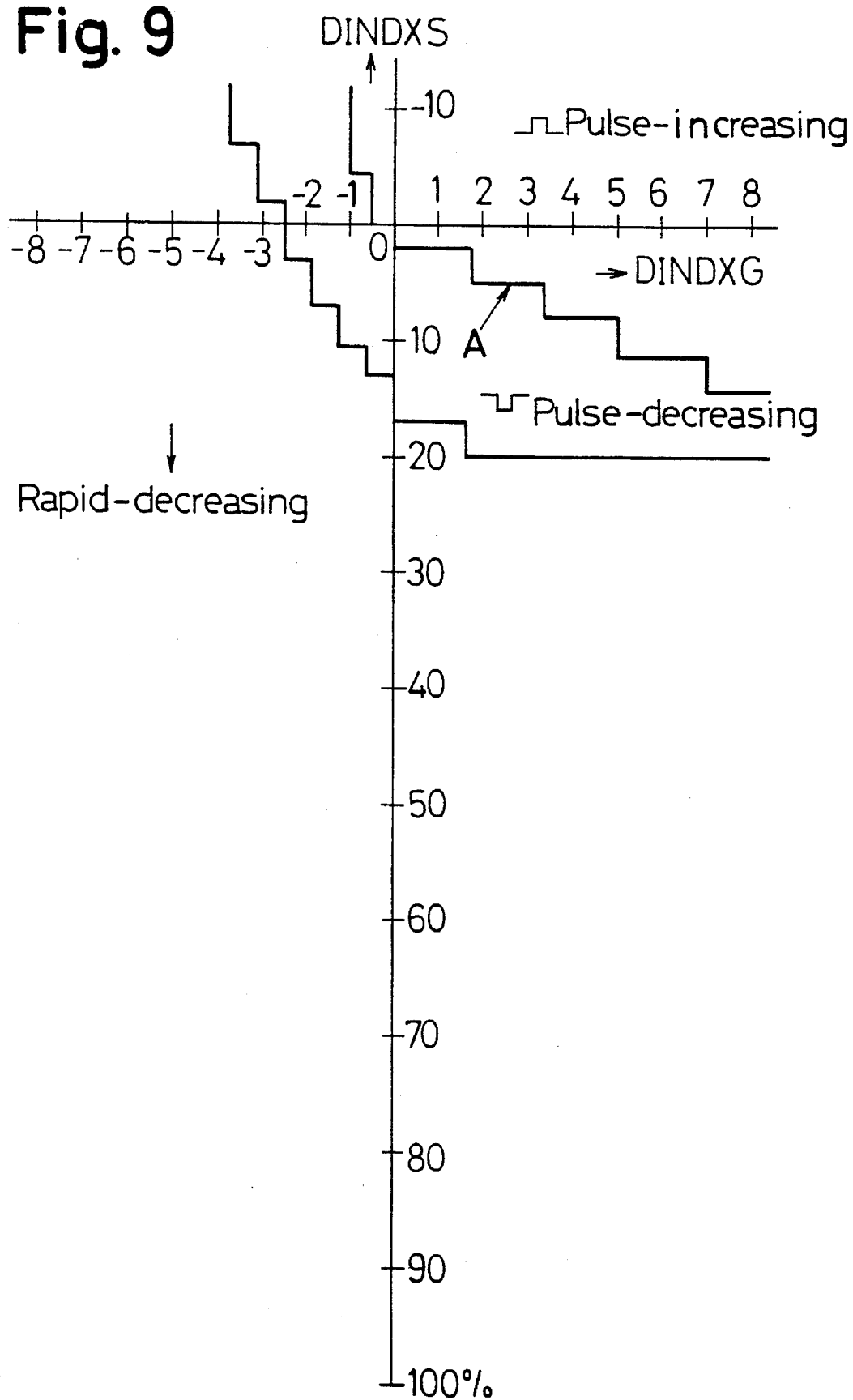
FIG. 9 is a graph showing an operation of a control mode setting division of an electric control unit.
Figure 10:
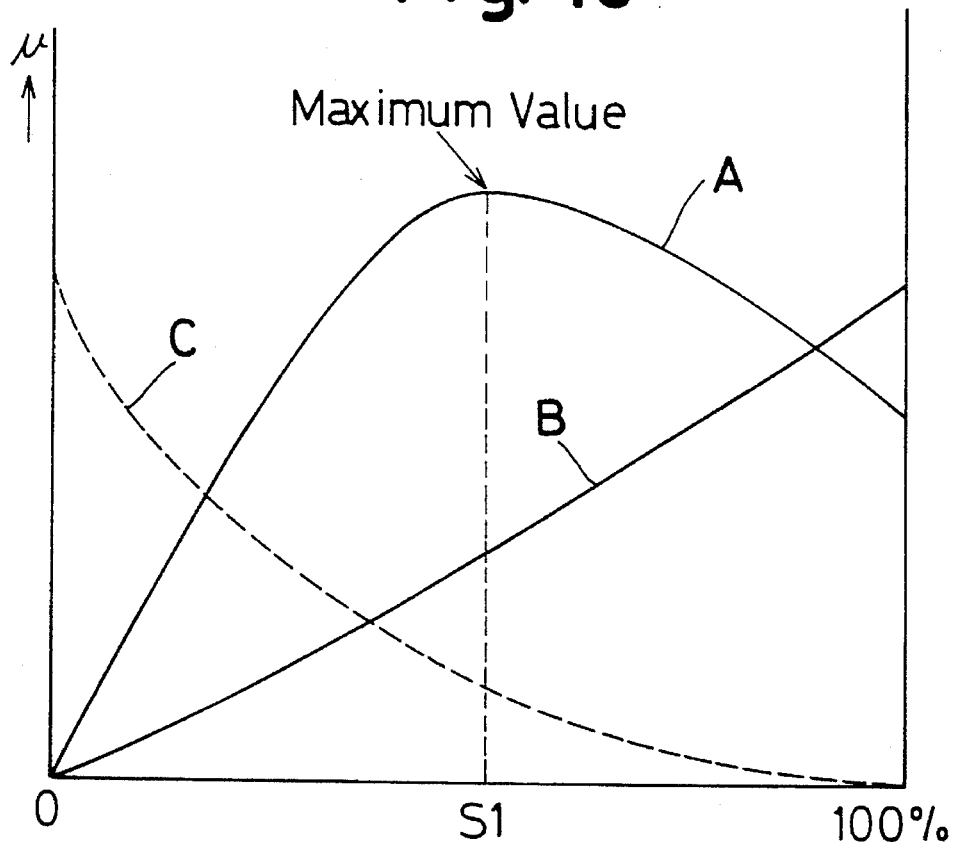
FIG. 10 is a graph showing an operation of an anti-skid system according to the present invention.

The control mode setting division 60 begins to set a control mode upon receipt of the slip rate component DINDXS and the G-component DINDXG. Three modes: the pulse-increase mode, the pulse-decrease mode, and the rapid-decrease modes are available. As described previously, the pressure in each of the wheel cylinders is increased thereby to increase the braking force when the electromagnetic valves 32–35 are opened, and the pressure in each of the wheel cylinders is decreased thereby to decrease the braking force when the electromagnetic valves 36–39 are opened. In the pulse-increase mode, under the closure of each of the electromagnetic valves 36–39, each of the electromagnetic valves 32–35 is set to be under the duty-control for increasing the braking pressure wherein an opening time of each of valves 32–35 are adjusted. In the pulse-decrease mode, under the closure of each of the electromagnetic valves 32–35, each of the electromagnetic valves 36–39 is set to be under the duty-control for decreasing the braking pressure wherein an opening time of each of valves 36–39 are adjusted. In the rapid-decreasing mode, the pressure in each of the wheel cylinder is rapidly decreased by establishing a condition wherein valves 32–35 are closed and the valves 36–39 are opened. At the mode setting division 60, concurrently with setting the foregoing three modes, the valve opening time and the pulse width are set in case of the pulse-increasing mode or the pulse decreasing mode. The setting of each mode is established based on a map shown in FIG. 9. In this map, in principle, as the slip rate increases the pulse-increasing mode, the pulse-decreasing mode, and the rapid-decreasing mode are set to be established in such order, and as the acceleration decreases the pulse-increasing mode, the pulse-decreasing mode, and the rapid-decreasing mode are set to be established in such order. That is to say, when the G-component is 0, the pulses are increase slightly in case that the deviation between the target slip rate and the real slip rate is 0, and as the slip rate deviation increases, the pulse-decreasing mode and the rapid-decreasing mode are established in turn. In the map, under this situation, corrections are set to be made toward the pulse-increasing mode and the pulse-decreasing mode when the deceleration is increased and decreased, respectively. Thus, the braking force is so adjusted to establish an coincidence of the target slip rate with the real slip rate, resulting in that the ultimately this coincidence is attained. Since this adjustment is made previously according to the acceleration, the quick control can be established.

The solenoid control division 61 serves for controlling the electromagnetic valves 32 through 39 based on the set mode at the control mode setting division 60, the valve opening time, the valve closing time, and the periodic time. In the pulse-increasing mode, the electromagnetic valves 36–39 are entirely closed, and the electromagnetic valves 32–35 are opened for a set time. The electromagnetic valves 32–35 are closed for a remaining time in a period. The opening and closing operations of each of the electromagnetic valves 32–35 are repeated. In the pulse-decreasing mode, the electromagnetic valves 32–35 are entirely closed, and the electromagnetic valves 36–39 are opened for a set time. The electromagnetic valves 36–39 are closed for a remaining time in a period. Such opening and closing operations of each of the electromagnetic valves 36–39 are repeated.

As mentioned above, in the present invention, since the pressure in each wheel cylinder is adjusted by the increase or the decrease thereof in chase of the target slip rate, the slip condition of each road-wheel is in coincidence with the target value set in the control unit. Since the target slip rate is so adjusted as to establish the maximum deceleration, the braking operation can be established under the maximum deceleration, which ensures the decrease of the braking distance independent of the condition of the road surface. In addition, the target slip rate is calculated taking into the consideration of the load of the vehicle, in spite of the variation thereof, the minimum braking distance is established. Furthermore, the load is detected at each road-wheel, the position of each passenger and the location of baggage are out of the consideration. The target slip rate is set to be lowered depending on the deviation between the target yaw rate and the real yaw rate as a result of the deviation between the target steering angle and the real steering angle, which ensures the sufficient cornering force with the result that the driver can make a steering operation even during the braking operation. In this case, by lowering the target slip rate in correspondence to the vehicle speed, the steering performance which is suitable for both high speed travel and low speed travel of the vehicle can be obtained. As the vehicle speed, it is desirable to be that near the center of the gravity of the vehicle body. If such vehicle speed is found not to be obtained, the maximum speed of each road-wheel is available. Such maximum speed brings the lowering range of the slip rate than the corresponding range if the vehicle speed near the center of the gravity of the vehicle body is used, more sufficient cornering force is obtained.

Figure 11:
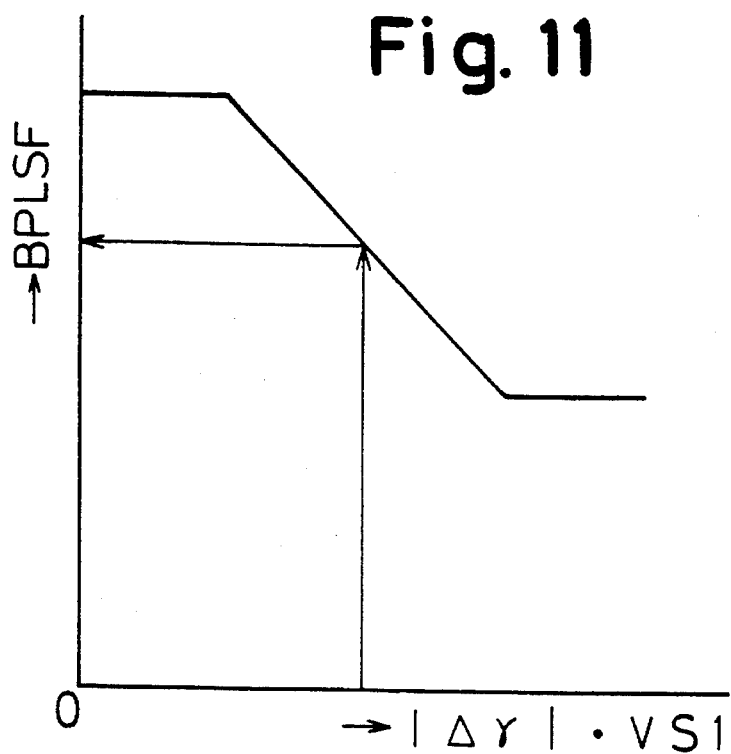
FIG. 11 is a graph showing an operation of a compensating pressure increase division of an electric control unit.

If the road-wheel is locked due to late initiation of the ABS-control, first of all, the pressure in the wheel cylinder is rapidly decreased for being released from the locked condition, and a compensation pressure increase is established for optimizing the pressure in the wheel cylinder. The quantity BPLSF required for establishing the compensation pressure increase is calculated at an increasing pressure quantity calculating division 67 and is corrected in accordance with the yaw rate deviation $\Delta\gamma$ and the maximum vehicle speed VS1 as shown in a graph in FIG. 11. In this compensation process, the quantity BPLSF becomes its maximum value when the absolute value of the yaw rate division $\Delta\gamma$ is low or the maximum vehicle speed VS1 is also low, and the quantity BPLSF is decreased as the absolute value of the yaw rate deviation $\Delta\gamma$ or the maximum vehicle speed VS1 increases. The quantity BPLSF is fed to the solenoid control division 61 and the solenoid control division 61 opens each of the valves 32–35 for a time corresponding to the quantity BPLSF.

The invention has thus been shown and described with reference to a specific embodiment, however, it should be noted that the invention is in no way limited to the details of the illustrated structures but changes and modifications may be made without departing from the scope of the appended claims.

What is claimed is:

1. An anti-skid control system for use in an automotive vehicle comprising:

brake detecting means for detecting a braking operation of the vehicle;

target slip rate calculating means for calculating a slip rate such that a deceleration of a vehicle-body becomes its maximum value and setting the resulting slip rate as a target slip rate; and adjusting means for adjusting a real slip rate of a wheel so as to be in coincidence with the target slip rate further comprising real yaw rate detecting means for detecting a real yaw rate of the vehicle, a target yaw rate setting means for setting a target yaw rate of the vehicle, yaw rate deviation calculating means for calculating a yaw rate deviation between the real yaw rate and the target yaw rate, and a slip rate regulating means for regulating the slip rate on the basis of the yaw rate deviation.

2. An anti-skid control system according to claim 1 further comprising steering angle detecting means for detecting a steering angle of the vehicle, wherein the target yaw rate setting means uses the steering angle upon setting of the target yaw rate.

3. An anti-skid control system according to claim 2 further comprising speed detecting means for detecting a speed of the vehicle, wherein the target yaw rate setting means uses the steering angle, and the speed of the vehicle upon setting of the target yaw rate.

4. An anti-skid control system according to claim 2 further comprising speed detecting means for detecting a speed of the vehicle at each road-wheel, and means for detecting the maximum value of the speed of the vehicle at each road-wheel, wherein the target yaw rate setting means uses the the maximum value of the speed of the vehicle upon setting of the target yaw rate.

5. An anti-skid control system according to claim 1, wherein the slip rate regulating means regulates the slip rate on the basis of the speed of the vehicle in addition to the yaw rate deviation.

6. An anti-skid control system according to claim 1 further comprising speed detecting means for detecting a speed of the vehicle at each road-wheel, and means for detecting the maximum value of the speed of the vehicle at each road-wheel, wherein the slip rate regulating means regulates the slip rate on the basis of the yaw rate deviation, and the maximum value of the speed of the vehicle.

* * * * *

UNITED STATES PATENT AND TRADEMARK OFFICE
CERTIFICATE OF CORRECTION

PATENT NO. : 5,470,136
DATED : 11/28/95
INVENTOR(S) : Kenji TOZU, Kenjie ASANO, Hiroaki KAWAI It is certified that error(s) appears in the above-identified patent and that said Letters Patent is hereby corrected as shown below:

On the title page,

Under "FOREIGN APPLICATION PRIORITY DATA", the date should read <u>September 25, 1991</u>, instead of [November 9, 1992].

Signed and Sealed this

Ninth Day of June, 1998

*Attest:*

BRUCE LEHMAN

*Attesting Officer*  *Commissioner of Patents and Trademarks*